United States Patent

Bell

[11] Patent Number: 6,011,781
[45] Date of Patent: Jan. 4, 2000

[54] MULTIPOINT ACCESS PROTOCOL UTILIZING A POINT-TO-POINT METHODOLOGY

[75] Inventor: Russell W. Bell, Austin, Tex.

[73] Assignee: Advanced Micro Devices, Inc., Sunnyvale, Calif.

[21] Appl. No.: 08/820,526

[22] Filed: Mar. 19, 1997

[51] Int. Cl.[7] .................................................. H04L 12/28
[52] U.S. Cl. ........................................... 370/254; 370/408
[58] Field of Search ..................................... 370/408, 419, 370/420, 421, 445, 446, 480, 485, 489, 410, 296, 352, 228, 447, 254; 375/222; 395/284, 830, 182.01, 200.54, 200.57, 290, 835, 200.63, 800.11

[56] References Cited

U.S. PATENT DOCUMENTS

| | | | |
|---|---|---|---|
| 4,766,591 | 8/1988 | Huang | 370/445 |
| 5,278,977 | 1/1994 | Spencer et al. | 370/228 |
| 5,285,474 | 2/1994 | Chow et al. | 379/222 |
| 5,331,315 | 7/1994 | Crosetto | 395/312 |
| 5,371,897 | 12/1994 | Brown et al. | 395/830 |
| 5,463,689 | 10/1995 | Schutte et al. | 380/20 |
| 5,479,447 | 12/1995 | Chow et al. | 370/468 |
| 5,539,739 | 7/1996 | Dike et al. | 370/352 |
| 5,557,612 | 9/1996 | Bingham | 370/485 |
| 5,576,702 | 11/1996 | Samoylenko | 370/447 |
| 5,590,284 | 12/1996 | Crosetto | 395/284 |
| 5,592,477 | 1/1997 | Farris et al. | 370/410 |
| 5,594,789 | 1/1997 | Seazholtz et al. | 379/207 |
| 5,625,651 | 4/1997 | Cioffi | 379/222 |
| 5,659,781 | 8/1997 | Larson | 395/800.11 |
| 5,754,789 | 5/1998 | Nowatzyk et al. | 395/200.63 |
| 5,774,731 | 6/1998 | Higuchi et al. | 710/200 |
| 5,825,755 | 10/1998 | Thompson et al. | 370/296 |

*Primary Examiner*—Douglas W. Olms
*Assistant Examiner*—Phirin Sam
*Attorney, Agent, or Firm*—Foley & Lardner

[57] ABSTRACT

A communication system includes a network of nodes connected in a multipoint configuration. Each of the nodes is configured to concurrently communicate with the other nodes on a point-to-point basis using, for example, a channelization characterization protocol such as DMT or CAP. The network may be a local area network in which the nodes are connected to each other via telephone wiring. Other telephone equipment may also use the telephone wiring concurrently, including a telephone using the telephone wiring for voice communication or a modem using the telephone wiring for data communication.

5 Claims, 10 Drawing Sheets

PRIOR ART

MULTIPOINT ACCESS PROTOCOL UTILIZING A POINT-TO-POINT METHODOLOGY

This application is related to a co-pending application entitled "NETWORK ADAPTER UTILIZING AN ETHERNET PROTOCOL AND UTILIZING A DIGITAL SUBSCRIBER LINE PHYSICAL LAYER FOR IMPROVED PERFORMANCE", filed Nov. 8, 1996, Ser. No. 08/744,438, the entire contents of which is hereby incorporated by reference.

BACKGROUND OF THE INVENTION

1. Field of the Invention

The invention relates to communication networks. More specifically, the invention relates to a local area network having a multipoint configuration in which communication between nodes takes place on a point-to-point basis.

2. Related Art

Figure 1A:
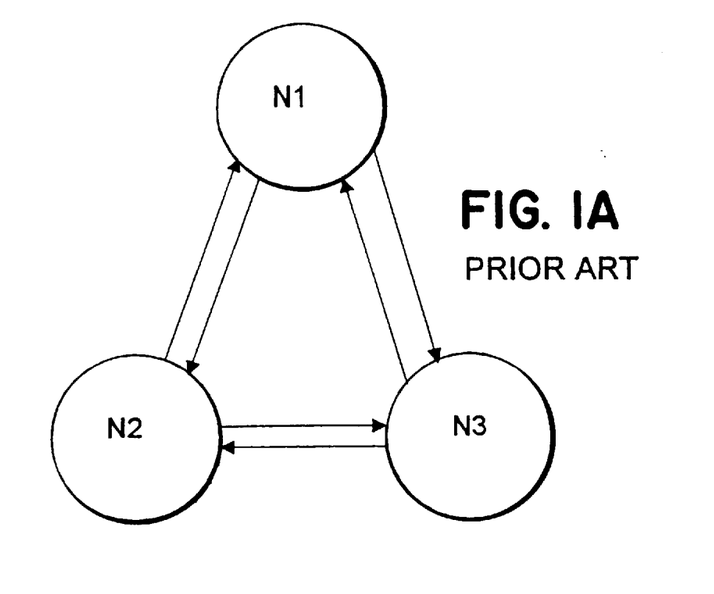
FIGS. 1A-B show a conventional point-to-point and multipoint network configuration, respectively.

Network configurations may be described as either a point-to-point configuration or a multipoint configuration. FIG. 1A shows an example of a conventional point-to-point configuration for a network. Nodes N1 . . . N3 are connected to each other on a point-by-point basis. In other words, N1 is directly connected to N2 and N3 on a physical (hardware) level via respective dedicated wiring. Likewise, N2 is directly connected to N1 and N3 and N3 is directly connected to N1 and N2.

As used herein, a node is defined as a data processing device configured to communicate with other devices. For example, a node may include a general purpose computer coupled with a modem or a network interface card. In another example, a node may include a special purpose device, such as a CD-ROM tower, coupled with a network interface card. The foregoing examples are provided for purposes of illustration and not limitation.

Figure 1B:
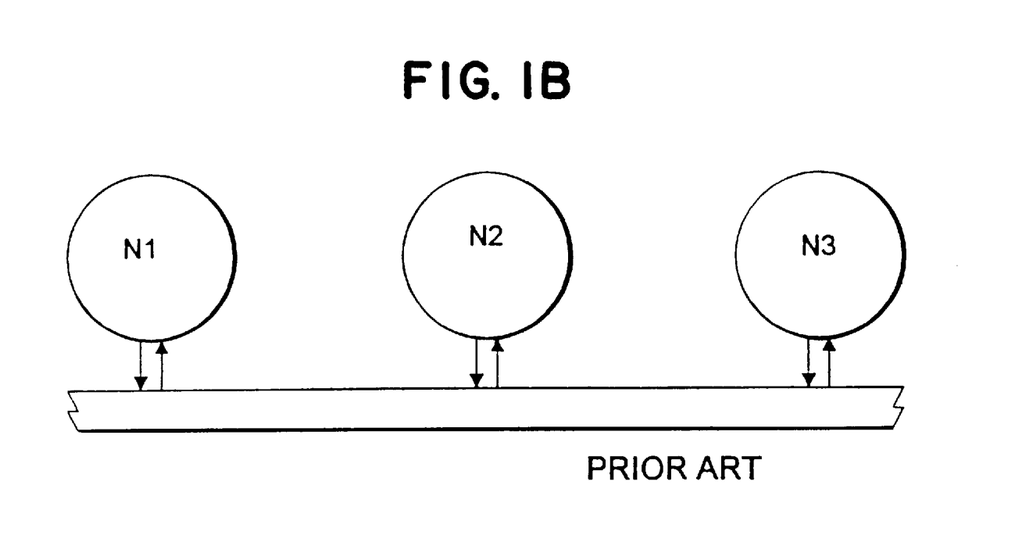

FIG. 1B shows an example of a conventional multipoint configuration for a network. Nodes N1 . . . N3 are connected to each over a shared communication medium, such as twisted pair wiring. In order for N1 to communicate with N2 or N3, a multipoint protocol must be used in order to avoid conflicts in allocation of the shared communication medium.

SUMMARY

It is an object of the invention to provide a discrete multi-tone (DMT)-based or other channel equalization-based protocol, as hereinafter described, to be used in a multipoint environment. Stated in another way, an object of the invention is to use a point-to-point protocol in a multipoint or star topology.

It is another object of the invention to provide point-to-point type communication between nodes that reside on a non-point-to-point link.

It is a further object of the invention for the nodes to communicate at a physical level. Specifically, it is an object of the invention to provide a channelization characterization protocol to be used in a star or bus topology.

The instant invention may be advantageously used with a contention bus with a discrete multi-tone DMT or a carrierless amplitude and phase (CAP) physical (PHY) layer. For example, the instant invention may be used with ETHERNET™ technology, to provide a system that is ETHERNET™ based. In another example, according to the invention, DMT or CAP based technology may be connected with an ETHERNET™ media access control (MAC) via a PHY layer to provide a systems level solution for many challenging network applications. Reference may be had to the above mentioned related application entitled "NETWORK ADAPTER UTILIZING AN ETHERNET PROTOCOL AND UTILIZING A DIGITAL SUBSCRIBER LINE PHYSICAL LAYER FOR IMPROVED PERFORMANCE" for further details.

The instant invention may be advantageously used, among other things, for home networks, cable modem applications, and low cost office networks.

The above and other objects of the invention are achieved by a communication system including a network of nodes coupled to each other in a multipoint configuration. Each of the nodes is configured to concurrently communicate with the other nodes on a point-to-point basis. The point-to-point basis includes, for example, a channelization characterization protocol such as, for example, DMT or CAP.

The communication system may include a local area network, where the nodes are coupled to each other via telephone wiring. The nodes may be configured to communicate with each other concurrently with other use of the telephone wiring by telephone equipment. For example, the telephone equipment may include a telephone and the other use may include voice communication. In another example, the telephone equipment may include a modem and the other use may include data communication.

BRIEF DESCRIPTION OF THE DRAWINGS

The above and other objects and advantages of the invention will be understood in light of the following detailed description in view of the drawings, wherein.

DETAILED DESCRIPTION

A variety of advanced technologies are known which provide higher bandwidth for networks using a copper-based communications channel, such as twisted pair wiring. Typically, these networks are highly telephone centric and are based on a conventional point-to-point network configuration, such as that used in a telephone company's local loop circuitry. As discussed in the above-identified related application Ser. No. 08/744,438, the use of an asymmetric digital subscriber line (ADSL) 'like' protocol (either DMT or CAP based) provides advantages for configuring home area networks utilizing the existing in-house telephony wiring.

Specifically, homes typically have multiple phone outlets. It is therefore possible to connect PCs and peripherals in different rooms via the existing telephone lines. As both DMT and CAP based technologies are based on modulation techniques that are out-of-band, they can operate concurrently with telephone conversation without creating interference. Therefore, using this technology as a physical layer for a home area network provides the following advantages:

1) The use of existing wiring, thus leveraging the installed base of equipment;
2) No additional wiring is required;
3) PCs and other devices can communicate while telephone conversations are in progress; and
4) Other protocols can run on top of this DMT or CAP based PHY layer once the channels have been initialized, as hereinafter described. In one preferred embodiment, an ETHERNET™ MAC is used on top of the DMT/CAP-based PHY layer.

Discussion of DMT

DMT is a technology that divides the available bandwidth of a channel into sections. Each of these sections is "characterized" for noise and attenuation. After the characteristics of the channel are known, the transmitters and receivers can compensate for the deficiencies in the transmission path. A "band" includes a group of contiguous sections. The "bands" of the channel that are deficient receive less data to transmit; good bands receive more data to transmit. The aggregate effect of this channelization is higher bandwidth over the channel. The principles of DMT are discussed in detail in U.S. Pat. No. 5,479,447, entitled "METHOD AND APPARATUS FOR ADAPTIVE, VARIABLE BANDWIDTH, HIGH SPEED DATA TRANSMISSION OF A MULTI-CARRIER SIGNAL OVER DIGITAL SUBSCRIBER LINES," the entire contents of which is incorporated by reference herein.

Phone lines are typically characterized by 4 kHz of bandwidth. Based on typical signal to noise ratios and Shannon's Theorem, the maximum capacity of the channel using conventional non-DMT techniques is under 100 kilobits per second (kbps). Shannon's Theorem is described in more detail in *Reference Data for Engineers, 8th Edition*, SAMS Publishing, the entire contents of which is incorporated by reference herein. Using DMT, 1.5 to 6 Mega-bits per second (Mbps) is possible using the same channel. The protocol for performing this characterization is well known in the art.

Figure 2:
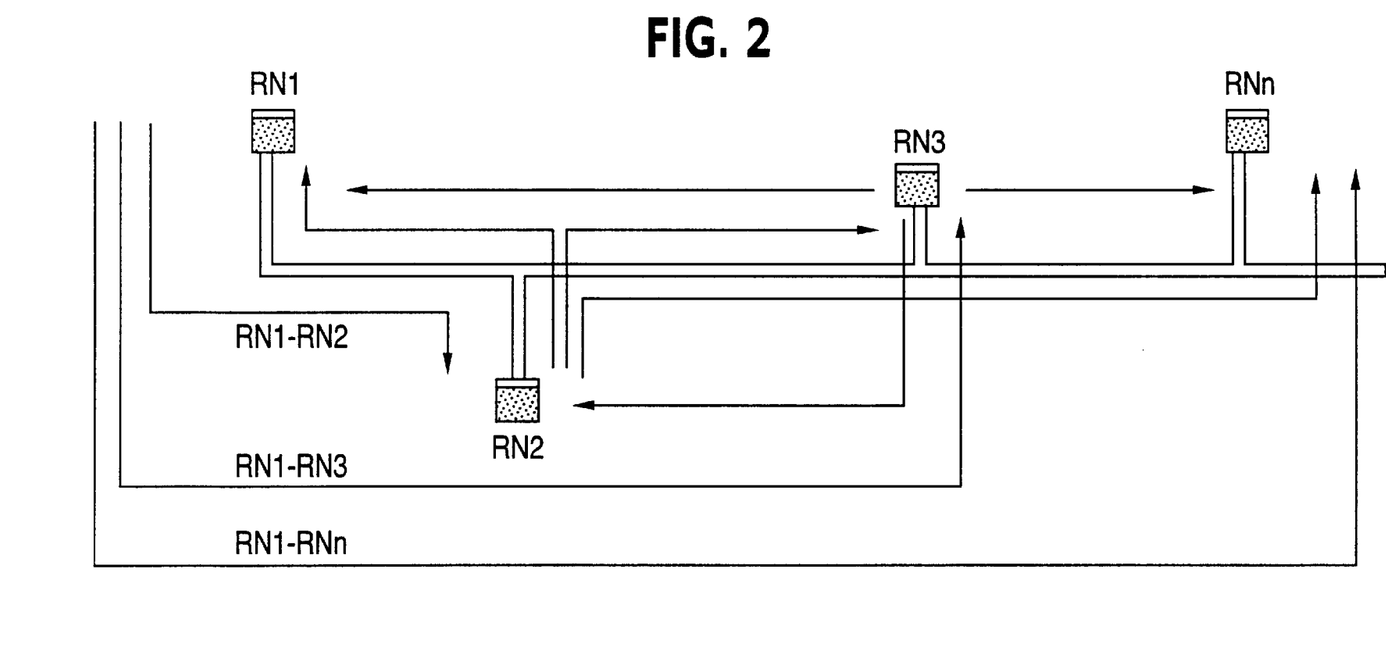
FIG. 2 shows a representation of multipoint network configuration according to the invention viewed as a group of point-to-point networks.

FIG. 2 shows that, according to the invention, a multipoint network configuration may be viewed as a plurality of point-to-point networks. Nodes RN1 though RNn, n being an integer greater than 1, are connected to each other over a shared communication medium, such as, for example, twisted pair wiring. According to the invention, when the network is considered to be series of point-to-point networks, the following "virtual networks" exist inside the physical network of FIG. 2. There is a point-to-point link from:

RN1 to RN2;
RN1 to RN3;
RN1 to RNn;
RN2 to RN1;
RN2 to RN3;
RN2 to RNn;
RN3 to RN1;
RN3 to RN2; and
RN3 to RNn.

In the above example, each of these "links" is analogous, for example, to a single point-to-point link used by a telephone company for connection of its loop equipment, although the distances between nodes RN1 through RNn will be considerably smaller in a home area network. According to the invention, a DMT-like protocol provides multipoint operation of a DMT (or other channel equalization) based PHY layer in conjunction with a local area network, for example, an ETHERNET™ based network as discussed in the related patent application Ser. No. 08/744,438. The procedures described herein provide a series of enhancements which allow for point-to-point operation over a multipoint network such as those typically found in small businesses and homes.

Figure 3:
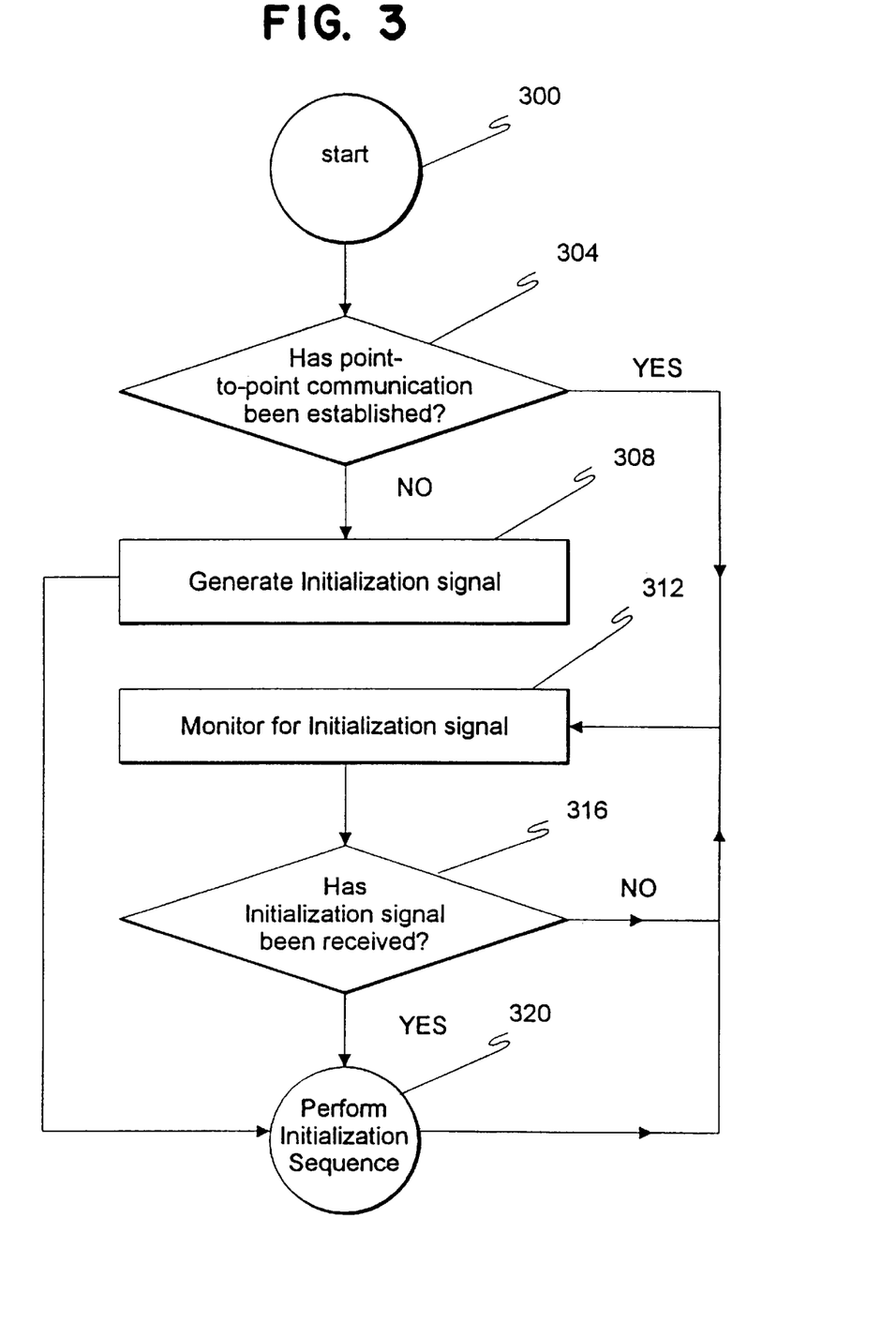
FIG. 3 shows a flow diagram of a method of operation according to a first embodiment of the invention for startup and/or reset of a node on the multipoint network.

A first embodiment of the invention is hereinafter described with respect to FIGS. 3–6. FIG. 3 shows a flow diagram of a method of operation according to the first embodiment of the invention for startup and/or reset of a node on the multipoint network. Upon startup, reset, or upon receipt of a signal indicating that resynchronization is required, the node begins processing at step 300. The node first determines, at decision step 304, if point-to-point communication has been established between the node and other nodes in the network. If such communication has been established, the node enters a normal processing loop, wherein the node monitors for an initialization signal (step 312), determines whether the initialization signal has been received (decision step 316), and performs an initialization sequence (step 320) if the initialization signal is received. If point-to-point communication has not been established, the node generates the initialization signal (step 308) to signal other nodes that re-initialization is required, and then performs the initialization sequence (step 320). After the initialization sequence is complete, the node returns to the normal processing loop (beginning with step 312).

Figure 4:
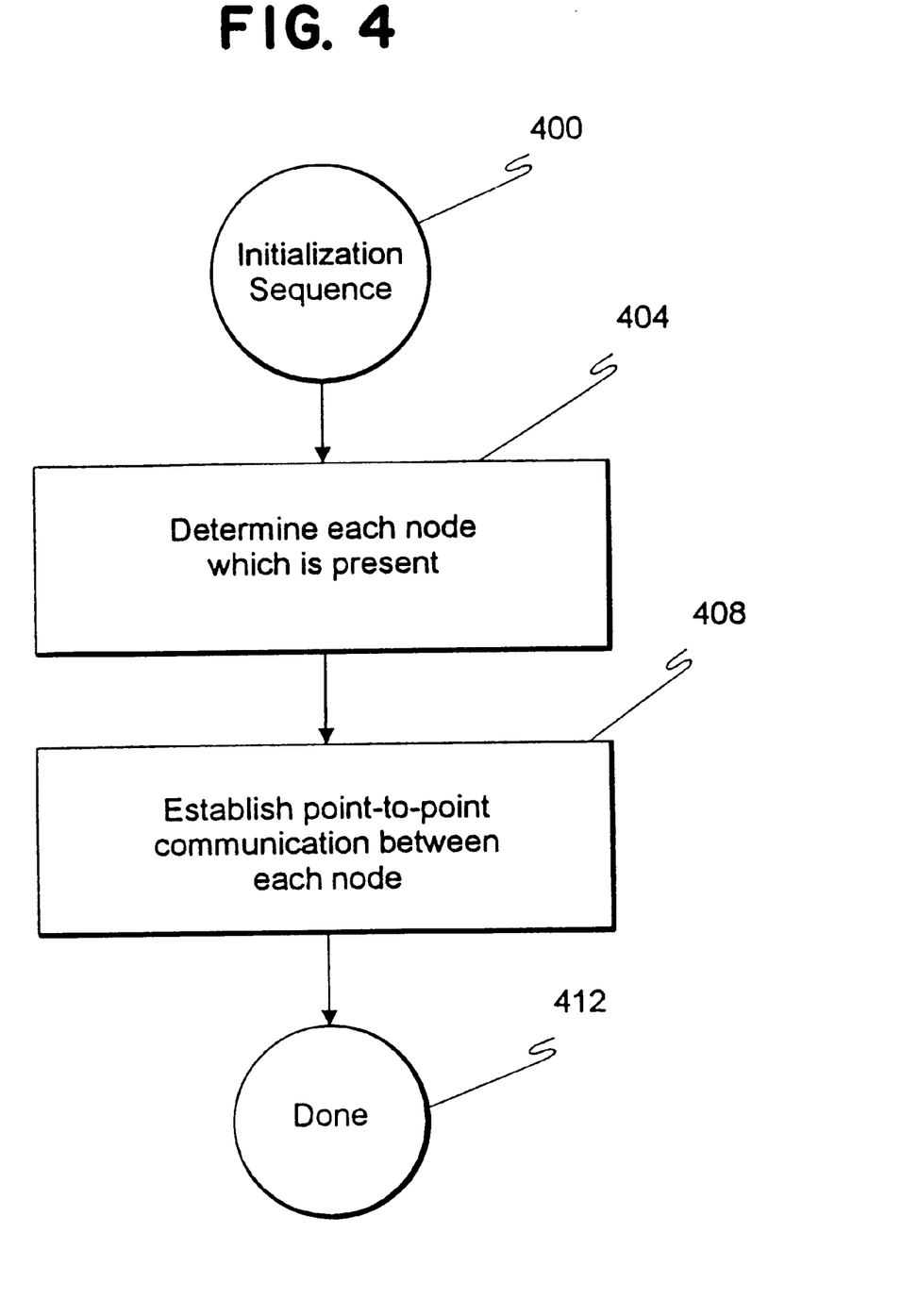
FIG. 4 shows a flow diagram of an initialization sequence according to the first embodiment of the invention.

FIG. 4 shows a flow diagram of an initialization sequence (beginning at step 400) according to the first embodiment of the invention. First, the node determines each of the other nodes which are present on the network (step 404). Then the node establishes point-to-point communication between the node and each of the other nodes determined to be present on the network (step 408). The initialization sequence is complete at step 412.

Figure 5:
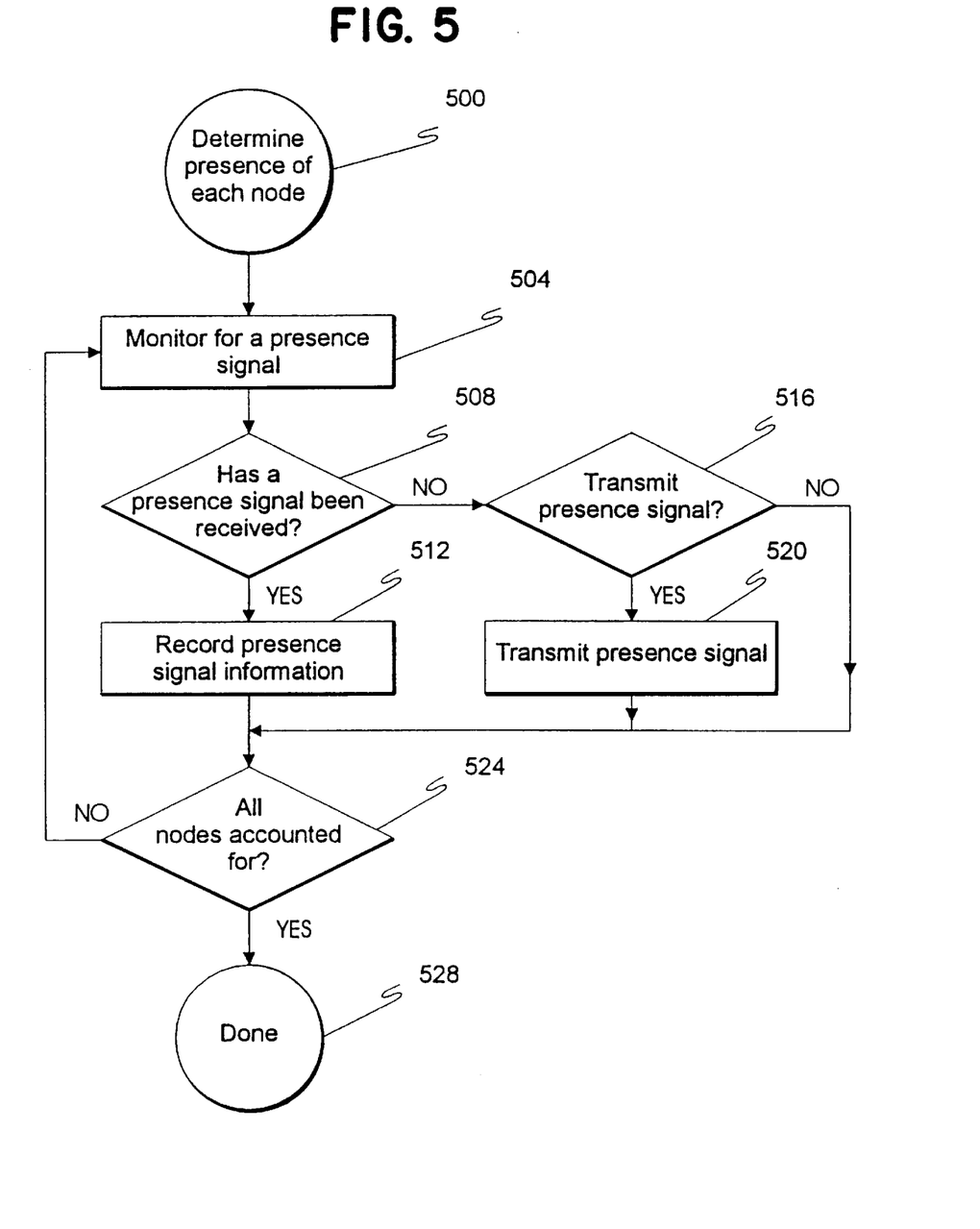
FIG. 5 shows a flow diagram of a method according to the first embodiment of the invention for determining the presence of each node on the multipoint network.

Beginning at step 500, FIG. 5 shows a flow diagram of a method according to the first embodiment of the invention for determining the presence of each node on the multipoint network, for example, as indicated in step 404 of FIG. 4. A monitoring loop begins with step 504, wherein the node monitors for a presence signal. The node determines whether a presence signal has been received (step 508), and if a presence signal has been received, the node records presence signal information (step 512). The presence signal information corresponds to an other node on the network which transmitted the presence signal and may include, for example, the other node's network address. If a presence signal has not been received, the node determines whether it should transmit its own presence signal (step 516) with its own corresponding presence signal information, and, if the node so determines, the node transmits its own presence signal (step 520). For example, each node may be configured to transmit its presence signal at a respective pre-determined time after receiving the initialization signal. The node then determines whether all nodes have been accounted for (step 524). If so, processing completes at step 528. If not, the monitoring loop repeats beginning with step 504.

Figure 6:
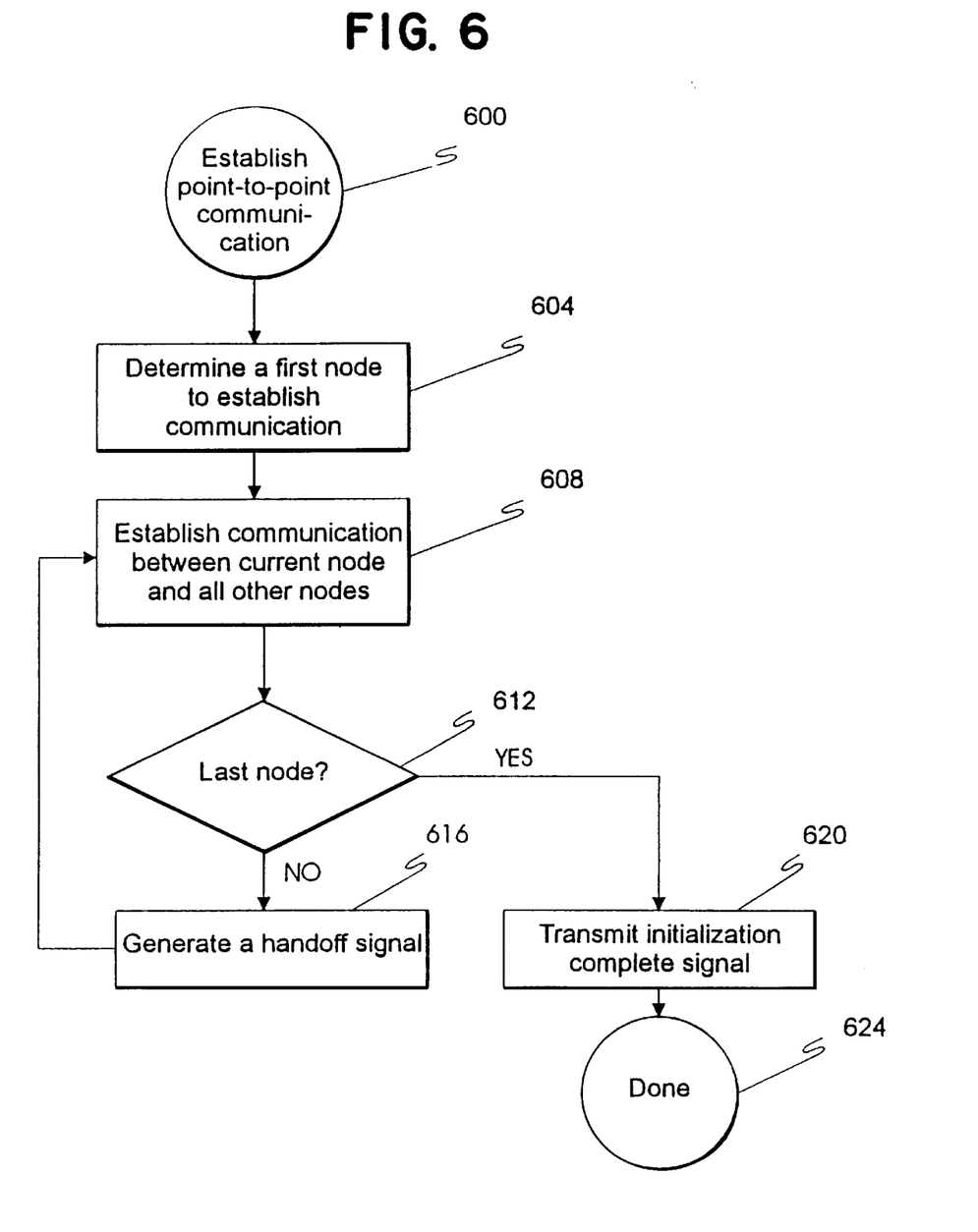
FIG. 6 shows a flow diagram of a method according to the first embodiment of the invention for establishing point-to-point communication between each node on the multipoint network.

Beginning at step 600, FIG. 6 shows a flow diagram of a method according to the first embodiment of the invention for establishing point-to-point communication between each node on the multipoint network, for example, as indicated in step 408 in FIG. 4. Each node on the network determines whether or not it should be the first node to establish communication (step 604). For example, one of the nodes may be pre-configured as a master node. Alternatively, the nodes may dynamically determine which node should go first, for example, as is hereinafter described with respect to a second embodiment of the invention. The node that is determined to be the first node is designated as the current node. The current node then enters a loop wherein communication is established between the current node and all of the other nodes on the network on an individual basis (step 608), for example, using DMT or CAP. The current node then determines whether it is the last node on the network to establish communication with the other nodes (step 612). If not, the current node generates a handoff signal (step 616) which is received by another node on the network. That other node is then designated as the current node and the loop repeats beginning at step 608. If the current node is determined to be the last node (step 612), the current node transmits an initialization complete signal (step 620) and point-point communication has been established between each of the nodes on the network at step 624.

A specific operation of a second embodiment of the invention is hereinafter described with respect to FIGS. 7–10. According to the second embodiment, information relating to the presence of other nodes on the network and communication characteristics for each point-to-point link is determined dynamically. Moreover, the hereinafter described procedures are generic and may be extended to operate in multi-node networks without any substantial modifications.

Figure 7:
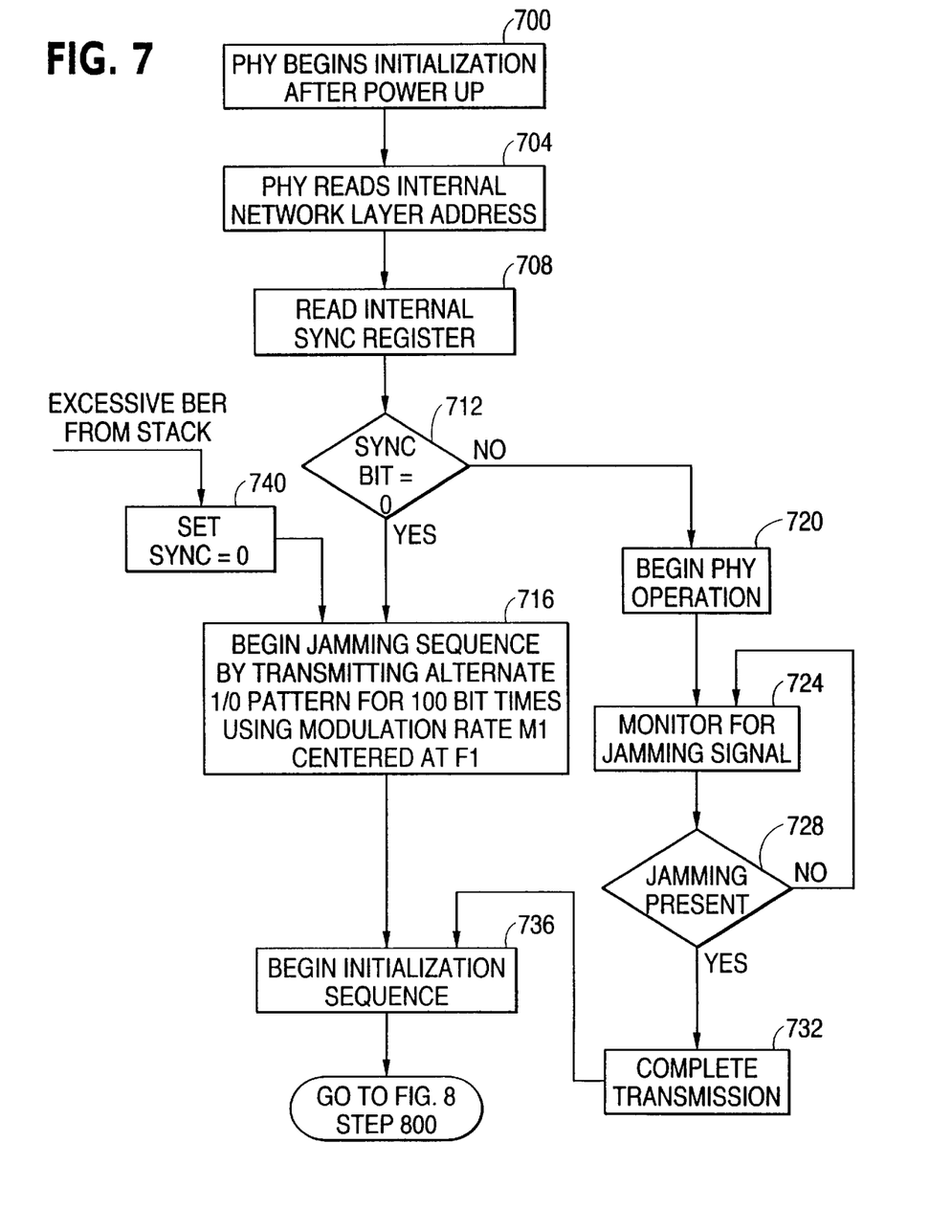
FIG. 7 shows a flow diagram of a method of operation according to a second embodiment of the invention for startup and/or reset of a node on the multipoint network.

FIG. 7 shows a flow diagram of a method of operation according to a second embodiment of the invention for startup and/or reset of a node on the multipoint network. A PHY (a node) "wakes up" after power-up or after just being connected to the multi-node network (step 700). The node knows its own internal address, which it reads at step 704, but nothing about other nodes on the network. The node, for example, reads an internal register to see if it is "synchronized" with the network (step 708). As used herein, a node considers itself to be "synchronized" if it has already completed the synchronization sequence. If this bit is one state, logical low, for example, it indicates that the node should begin a synchronization sequence (beginning with step 716). The other state, a logical one for example, in the SYNC bit indicates that the node was previously "synchronized", i.e. the node "knows" the channel characteristics for each virtual point-to-point link for which it has access, and the node proceeds to normal operation (step 720). For example, this information may have been stored in a non-volatile storage media, such as EEPROM or a hard disk drive from a previous initialization sequence.

Note that a node which has been previously powered down or disconnected from the network may, upon power up or reconnection to the network, consider itself synchronized when in fact an intervening re-initialization has occurred. This situation may cause excessive collisions which would be detected by upper level constructs in the protocol stack which would then initiate the synchronization sequence.

If the SYNC bit is low, the node begins a jamming sequence at a pre-determined jamming frequency and a predetermined signal pattern (step 716). In general, a jamming sequence refers to a sequence of bits that would normally not be present on the network. For example, an alternating one/zero pattern may be used for 100 bit times transmitted in an 1 kHz modulation of an FM carrier centered around 100 kHz. The jamming sequence indicates that the node has joined the network and each of the nodes must re-initialize for communication with each other. While the specific duration of the jamming signal is not critical, the duration is preferably long enough for all nodes to detect and process the jamming signal, but not so long as to significantly impact network performance. As discussed below, the duration of the jamming signal should be long enough for each node to complete processing of any current communication packet.

During normal operation, all the nodes monitor the jamming frequency (step 724). When the other nodes detect this jamming sequence (step 728), they complete the transmission of their current communication, which may be, for example, a data packet, (step 732) and enter the initialization mode (step 736). At this time, the nodes cease further transmission until all of the virtual point-to-point links have been initialized.

Preferably, the nodes enter the initialization mode substantially simultaneously. For example, each node may be configured to enter the initialization mode only when the jamming signal has ceased. By setting the duration of the jamming signal longer than the time it takes a node to process a packet, processing of the packet (i.e. step 732) will complete before the jamming signal ceases. All the nodes will therefore be waiting for the jamming signal to cease and when the jamming signals ceases every node will enter the initialization mode at substantially the same time.

A node may also cause re-initialization based on other received or generated signals (step 740). For example, if a bit-error-rate (BER) exceeds a predetermined threshold, or if the upper layers in the protocol stack receive an excessive number of corrupted packets, they can communicate with the appropriate PHY to begin the "reinitialize" jamming sequence that resets each of the nodes on the link via the jamming channel.

Figure 8:
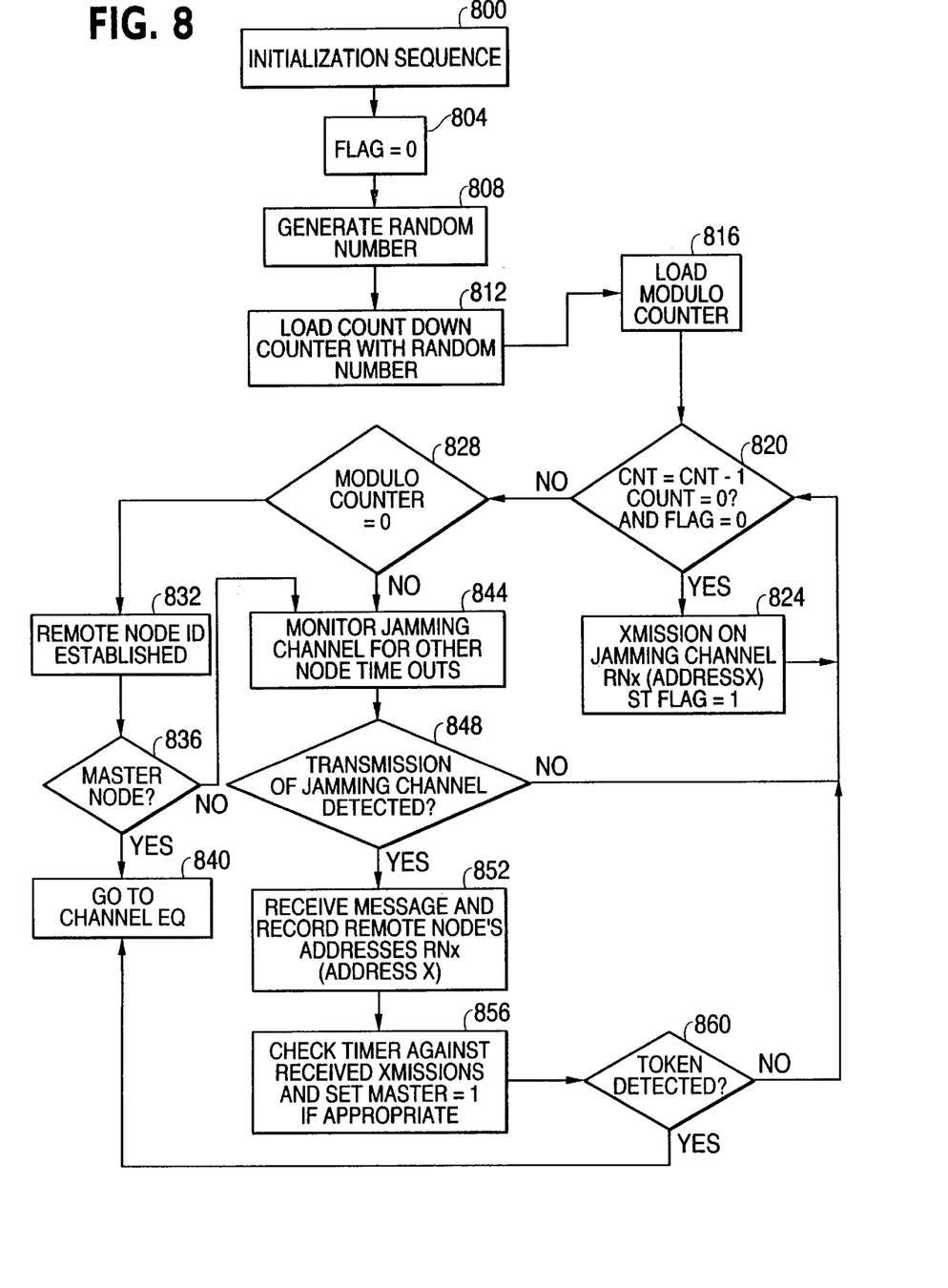
FIG. 8 shows a flow diagram of an initialization sequence and method of determining the presence of each node on the multipoint network according to the second embodiment of the invention.

Beginning with step 800, FIG. 8 shows a flow diagram of an initialization sequence, for example, as indicated in step 736, and a method of determining the presence of each node on the multipoint network according to the second embodiment of the invention. Upon the entering of the initialization mode (step 800), each node sets a FLAG to zero (step 804), generates a random number (step 808), and starts two counters:

(1) a count down timer that is loaded with its random number (step 812); and (2) a modulo counter that is set to the maximum time that would be required for all of the nodes on the network to complete their initialization transmissions (step 816).

Figure 10:
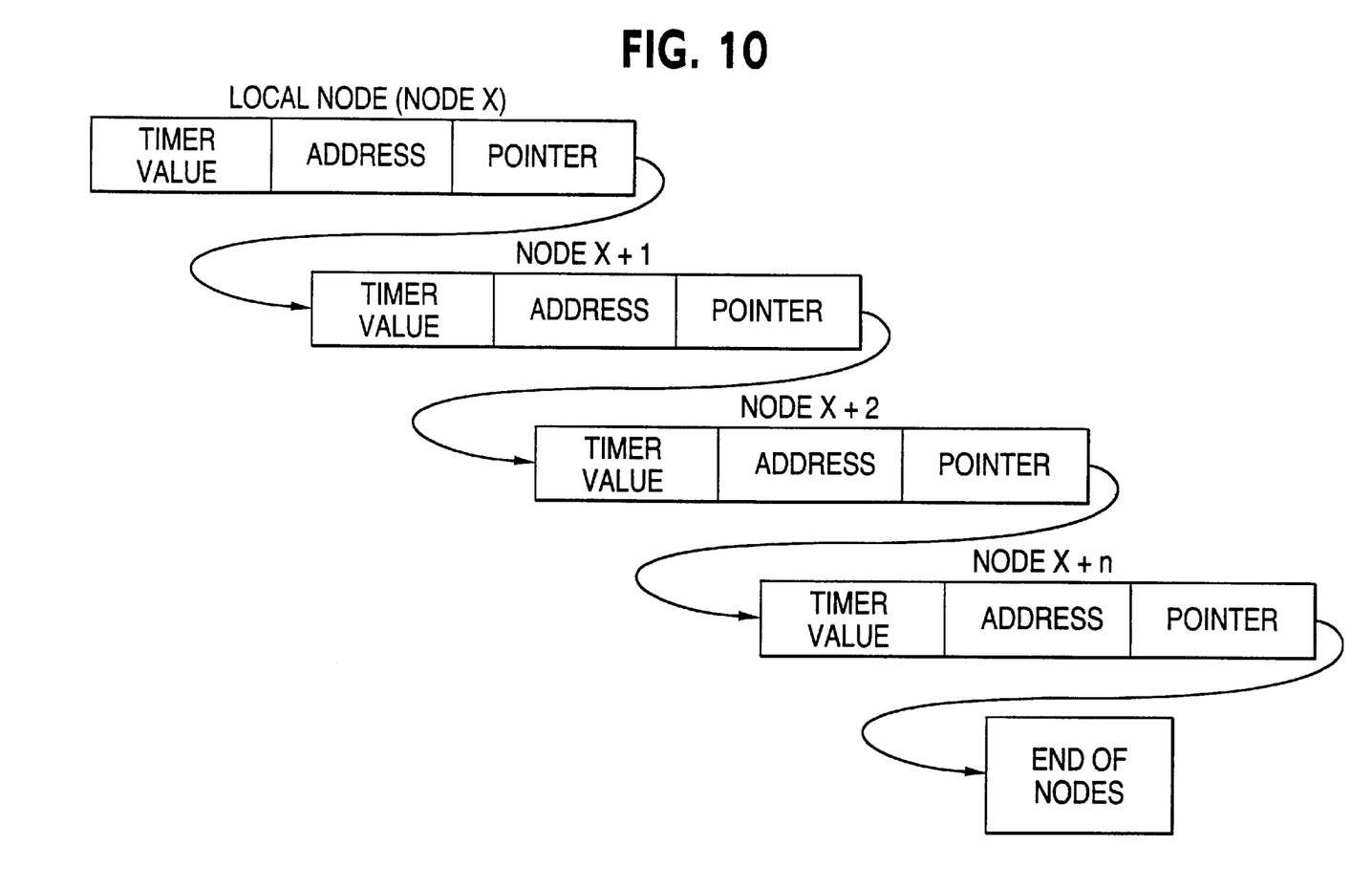
FIG. 10 shows a frame structure according to the second embodiment of the invention for maintaining a list of information related to each node present on the multipoint network.

Typically, the size of the MODULO counter is equal to the maximum size of the random number. Upon expiration of the random number count down timer (step 820, when Count=0), the node will begin to transmit a specialized header using the jamming channel (step 824). For example, the header may include:

RNx (timer value node x) (address x);

where x corresponds to the node number. The structure of the header is hereinafter described in detail with respect to FIG. 10. All of the nodes monitor the jamming channel for other nodes' transmissions (loop beginning with step 844). When a transmission is detected (step 848), the transmission is received and recorded by all other nodes on the network (step 852). For example, each node records all of the addresses and timer values of the other nodes.

At respective points in time, the random number timers expire on each of the remaining nodes. Each node successively transmits a signal on the jamming channel that contains its timer value and address, thereby indicating its presence to all other nodes on the network. As discussed above, each of the receiving nodes record the transmitted address and timer value.

When the last node's timer expires, it transmits its timer value and address for the remaining nodes to receive and record. When the last node's timer expires, the last node transmits its initial time value and real address on the jamming channel, followed by:

RN1 (address 1) RN2 (address 2) . . . RNn (address n)

where n=the number of nodes. The reception of this sequence indicates that the modulo timer has wrapped and all nodes have exchanged information.

As discussed above, the nodes enter the initialization mode substantially simultaneously in order to avoid having the first node's modulo counter wrap before the last node transmits its presence signal. After the modulo timer has wrapped (step 828), indicating that there can be no other nodes on the net that have not yet timed out and transmitted their timer values and addresses, each node on the network is aware of every other node on the network (step 832). The last node to transmit will "know" it is the last node when the modulo timer wraps. At this point, each node has a record of a timer value and an address for every other node. The "last node" to transmit will compare its timer value with the timer values that it has "heard" on the network and it will realize that it has the highest value timer and is therefore, the last node to transmit (step 836).

The node that determines itself to be the master node will initiate the channel equalization procedure (step 840). For example, the first node whose random number timer reaches zero may be designated as the master node. This node will recognize itself as the master node because it will not have seen any transmission from any other node when its timer expires. Therefore, it will have the lowest timer value and this information is transmitted to all other nodes as part of the initialization sequence (along with the real address of this node). The other nodes return to the loop for monitoring the jamming channel beginning with step 844 until they detect a corresponding handoff signal, as hereinafter described, at step 860.

Figure 9:
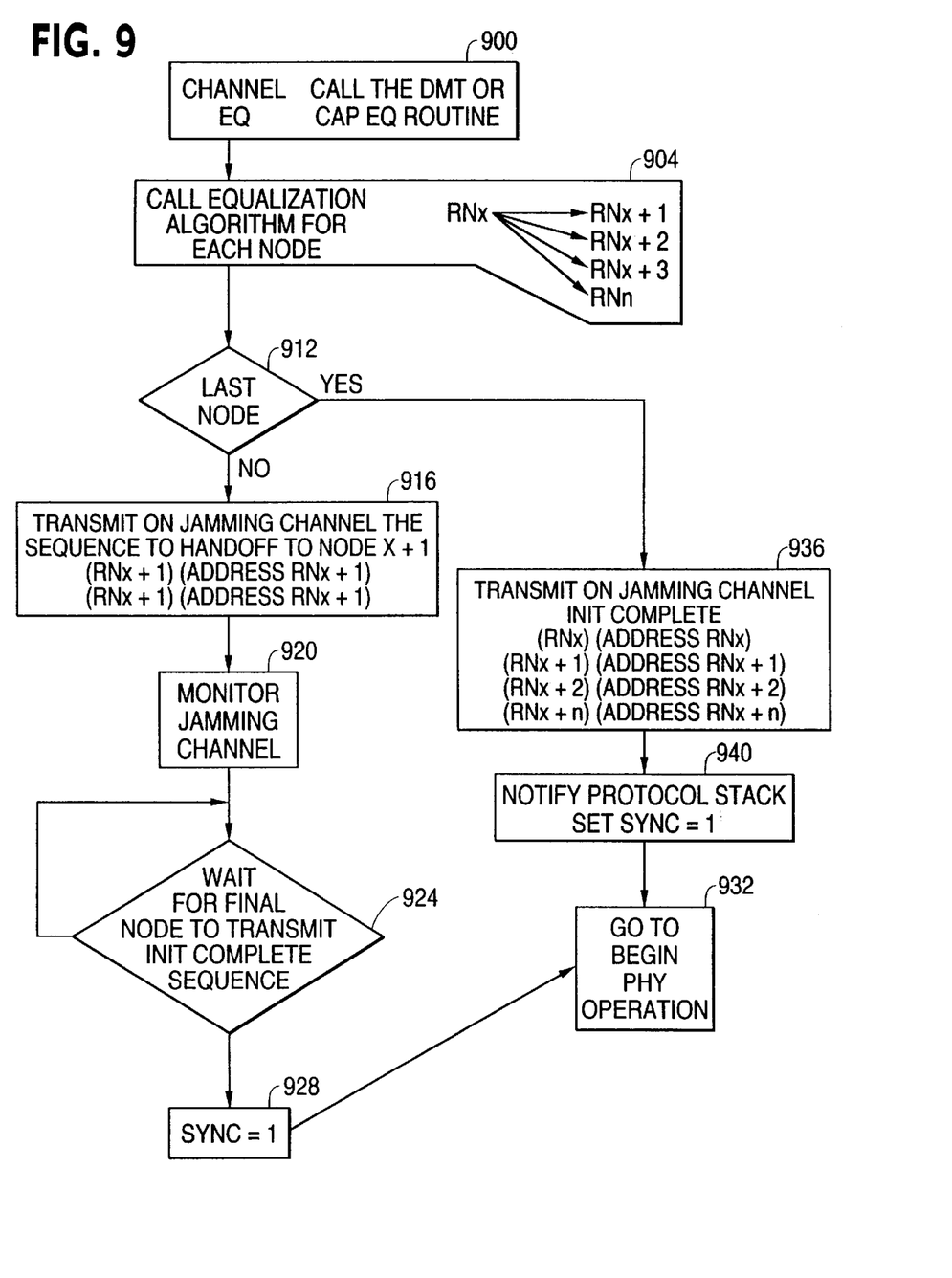
FIG. 9 shows a flow diagram of a method according to the second embodiment of the invention for establishing point-to-point communication between each node on the multipoint network.

Beginning with step 900, FIG. 9 shows a flow diagram of a channel equalization procedure, for example, as indicated in step 840, according to the second embodiment of the invention, for establishing point-to-point communication between each node on the multipoint network. As discussed above, at step 832 in FIG. 8, each node is aware of the presence of all of the other nodes on the network. However, the transmission characteristics of each of the paths between each of the nodes has not yet been established. At this point, the master node is designated as the current node and begins the process of establishing point-to-point communication between the nodes. The current node uses the DMT (or equivalent) initialization sequence between the current node and each of the other nodes on the network on an individual basis (step 904). Each node stores these channel characteristics for future use. For example, in a subsequent communications between two nodes, the appropriate channel characteristics are retrieved and used for the communication.

At this point, the current node has completed its initialization and channel characterization. The current node then determines if it is the last node to establish point-to-point communication with the other nodes (step 912). If not, the current node generates a special HAND-OFF frame that is transmitted on the jamming channel (step 916). For example, the frame may have the bit pattern RNx RNx (the transmission of RNx's address twice in succession, where x corresponds to the node number). This instructs RNx that it is time for RNx to determine the characteristics of the channels between RNx and each of the other nodes on the network. The current node then enters a monitoring loop beginning with step 920, thereby joining the other nodes in monitoring the jamming channel while the other nodes establish point-to-point communication. Preferably, the link between two nodes is separately established for each communication direction. For example, a separate communication linked is established for RN1–RN2 and RN2–RN1. While it is possible that the links to be identical, better equalization/characterization of the network is provided by separate links.

Upon receiving the HAND-OFF frame, RNx is designated as the current node and enters the process described above beginning with step 900. HAND-OFF frames are transmitted (step 916) by each node in succession until the current node determines itself to be the last node (step 912). For example, if, during the initialization sequence, a node did not receive a transmission from another node between when the node's count down timer expired and the expiration of the modulo timer, then that node is the last node on the network. The node recognizes itself to be the last node, for example, based on recorded timer values.

After the last node establishes point-to-point communication with the other nodes (step 904) and determines itself to be the last node (step 912), the last node transmits a special pattern on the jamming channel, for example, RN1 RN2 . . . RNn (step 936). The other nodes receive the special pattern (step 924) and recognize that the multipoint network is now initialized (steps 928 and 940), with every node being aware of and in point-to-point communication with every other node. Furthermore, every point-to-point link has been characterized using a DMT based algorithm and high speed communications are now ready to begin (step 932).

According to the invention, once each of the point-to-point paths 'characteristics' have been established, and depending on how each link has been characterized, communications can occur concurrently between each of the respective nodes using the appropriate characteristics for each respective link. If during the initialization process, the point-to-point link is characterized using a limited, non-overlapping set of frequencies (i.e. a subset of the entire bandwidth), then channels can be reserved between nodes that are exclusive and simultaneous communication between nodes can occur without collision. For example, assuming 10 MHz of total bandwidth and point-to-point links for three nodes, the total bandwidth can be divided into six frequency ranges of 1.66 MHz each with each range being assigned to one of the six point-to-point links. On the other hand, if each link is characterized to use all of the available bandwidth, an attempt to communicate simultaneously would cause a collision. In either case, communication may take place using a variety of MACs, including ETHERNET™.

FIG. 10 shows a frame structure according to the second embodiment of the invention for maintaining a list of information related to each node present on the multipoint network. For example, jamming channel transmissions, as described above, use the frame structure shown in FIG. 10. The frame structure includes the initial value of RNx's random number followed by the RNx's internal address.

For recording purposes, each of the nodes uses the internal suffix 'x' for it's designator. A linked list (as shown in FIG. 10) may be used during the initialization process to traverse the network topology. For example, for a network having n+1 nodes, the linked list includes n+1 entries, where each entry represents one of the nodes on the network. Each node recognizes the entries in the frame structure as being associated with a corresponding node based on the address and the timer value. Preferably, each node places its own entry in the list as the first entry.

The list is created during the initialization sequence when the node determines the presence of all of the other nodes. Then the list is traversed, using pointer information, during the establishing of point-to-point communication. When the end point or null pointer is reached, the node recognizes that it has completed the initialization necessary to establish the channel characteristics for each of the virtual point-to-point links. Other processes may also subsequently traverse the list to locate network information, including each of the virtual point-to-point segments.

In the second embodiment, collision may occur during the initialization process. However, the PHY may not be aware of the collision because there is not a collision detection mechanism analogous to the DC offset caused in a Manchester encoded PHY (typically used by ETHERNET™) when two signals collide. However various approaches may be used to resolve this problem. For example two alternatives include:

1) Use higher layers in the protocol stack to resolve the collisions and retransmit the data that was impacted.
2) The initialization scheme may be modified to use dedicated bands of frequencies between each of the point-to-point links.

Also, if the BER exceeds some threshold or the upper layers in the protocol stack continue to receive corrupted packets, they can communicate with their appropriate PHY to begin a "reinitialize" sequence that resets each of the nodes on the link via the jamming channel (step 740 from FIG. 7). Similarly, if two or more of the nodes generate identical or close random numbers, there is a finite possibility that the nodes may attempt to initialize the channels at the same time. The results of the subsequent channel characterization will be unpredictable and may result in unstable operation. The higher layer protocol stacks will detect this mis-operation in the form of lost packets, higher bit error rates, etc., and can force the links to resynchronize. It is unlikely that multiple nodes will select the same random number on iterative attempts at initialization.

Another way to avoid collisions is to record specific channel characteristic information for each of the nodes. For example, when sending the hand off signal (step 616 of FIG. 6, step 916 of FIG. 9), an additional field (i.e. a USED FREQ field) is passed corresponding to the actual operating frequencies used during the previous channel equalization processes. The receiving node avoids operating at these frequencies during its initialization process. The receiving node then updates this field when it sends the hand off signal to the next node. Subsequent nodes recognize the frequencies transmitted in the USED FREQ field as not available and initialize accordingly. Also, the protocol could be modified to negotiate how much total bandwidth is available over the system and how much bandwidth each node gets.

While specific embodiments of the invention have been described and illustrated, it will be clear that variations in the details of the embodiments specifically illustrated and described may be made without departing from the true spirit and scope of the invention as defined in the appended claims.

What is claimed is:

1. A communication system comprising:
a plurality of nodes coupled to each other in a multipoint configuration,
wherein each of said plurality of nodes is configured to concurrently communicate with others of said plurality of nodes on a point-to-point basis,
wherein each of said plurality of nodes is configured to determine whether said point-to-point communication has been established with said others of said plurality of nodes,
wherein each of said plurality of nodes is configured, if said point-to-point communication has not been established, to transmit a pre-determined initialization signal,
wherein each of said plurality of nodes is configured to monitor for said pre-determined initialization signal and, in response to receiving said pre-determined initialization signal, to perform an initialization sequence wherein said point-to-point communication is established between each of said plurality of nodes,
wherein each of said plurality of nodes is configured, during said initialization sequence, to determine the presence of said others of said plurality of nodes and thereafter to establish said point-to-point communication between each of said plurality of nodes and said others of said plurality of nodes, respectively,
wherein each of said plurality of nodes is configured to transmit a presence signal, to receive and record other presence signals from said others of said plurality of nodes, and to determine when all of said plurality of nodes have transmitted their respective presence signals, and
wherein each of said plurality of nodes is configured, when all of said plurality of nodes have transmitted their respective presence signals:
to determine a first node of said plurality of nodes to establish said point-to-point communication with said others of said plurality of nodes,
to determine a last node of said plurality of nodes to establish said point-to-point communication with said others of said plurality of nodes,
to transmit a hand-off signal corresponding to one of said others of said plurality of nodes when said point-to-point communication has been established between each of said plurality of nodes and said others of said plurality of nodes, respectively,
to receive a hand-off signal corresponding to each of said plurality of nodes and, in response to receiving said corresponding hand-off signal, to establish said point-to-point communication with said others of said plurality of nodes,
wherein said first node establishes said point-to-point communication with said others of said plurality of nodes without receiving said corresponding hand-off signal, and
wherein said last node transmits an initialization complete signal instead of said hand-off signal.

2. A method of communication, comprising the steps of:
coupling a plurality of nodes to each other in a multipoint configuration; and configuring each of said plurality of nodes to concurrently communicate with others of said plurality of nodes on a point-to-point basis, wherein, if any one of said plurality of nodes is not capable of communicating with all others of said plurality of nodes on the point-to-point basis, said any one of said plurality of nodes outputs a jamming signal at a predetermined frequency to all others of said plurality of nodes, wherein receipt of the jamming signal by each of said plurality of nodes causes each of said plurality of nodes to enter an initalization mode to attempt a set up of communications between each of said plurality of nodes on the point-to-point basis.

3. A method of providing a point-to-point communication, in a communication system comprising a plurality of nodes coupled to each other in a multipoint configuration, said method comprising the steps of:

(A) determining whether said point-to-point communication has been established between each of said plurality of nodes;

(B) transmitting an initialization signal if said point-to-point communication has not been established;

(C) monitoring for said initialization signal; and (D) performing an initialization sequence, in response to receiving said initialization signal, wherein said point-to-point communication is established between each of said plurality of nodes, wherein said initialization sequence comprises the steps of:

(i) determining the presence of each of said plurality of nodes; and (ii) establishing said point-to-point communication between each of said plurality of nodes determined to be present, respectively, wherein step (ii) comprises the steps of:

(a) determining a first node of said plurality of nodes as a current node to establish said point-to-point communication with said others of said plurality of nodes;

(b) establishing said point-to-point communication between said current node and said others of said plurality of nodes, respectively;

(c) determining if said current node is a last node of said plurality of nodes to establish said point-to-point communication with said others of said plurality of nodes;

(d) if said current node is not determined to be said last node:

(1) transmitting a hand-off signal from said current node, said hand-off signal corresponding to one of said others of said plurality of nodes;

(2) receiving said hand-off signal at said one of said others of said plurality of nodes;

(3) repeating steps (b)–(d) with said one of said others of said plurality of nodes as said current node; and (e) if said current node is determined to be said last node:

(1) transmitting an initialization complete signal from said last node to said others of said plurality of nodes.

4. A method of providing a point-to-point communication, in a communication system comprising a plurality of nodes coupled to each other in a multipoint configuration, said method comprising the steps of:

(A) determining whether said point-to-point communication has been established between each of said plurality of nodes; and (B) transmitting an initialization signal if said point-to-point communication has not been established, wherein step (B) comprises the steps of:

(i) outputting a jamming signal by each of said plurality of nodes that have established point-to-point communications with all others of said plurality of nodes, the jamming signal being of a preset duration and being output on a preset jamming frequency;

(ii) monitoring, by each of said plurality of nodes, the preset jamming frequency at a rate of monitoring that has a corresponding period of monitoring that is less than the preset duration; and (iii) detecting the jamming signal by each of said plurality of nodes, and entering an initialization mode by each of said plurality of nodes as a result of the detecting.

5. A communication system comprising:

a plurality of nodes coupled to each other in a multipoint configuration, wherein each of said plurality of nodes is configured to concurrently communicate with others of said plurality of nodes on a point-to-point basis, wherein each of said plurality of nodes is configured to determine whether said point-to-point communication has been established with said others of said plurality of nodes, wherein each of said plurality of nodes is configured, if said point-to-point communication has not been established, to transmit a pre-determined initialization signal, wherein each of said plurality of nodes is configured to monitor for said pre-determined initialization signal and, in response to receiving said pre-determined initialization signal, to perform an initialization sequence wherein said point-to-point communication is established between each of said plurality of nodes, wherein the initialization signal is transmitted for a time duration that is longer than an inverse of a rate of monitoring by each of said plurality of nodes, and wherein the initialization signal is transmitted on a preset frequency that is reserved only for the initialization signal.

* * * * *